United States Patent Office 3,053,686
Patented Sept. 11, 1962

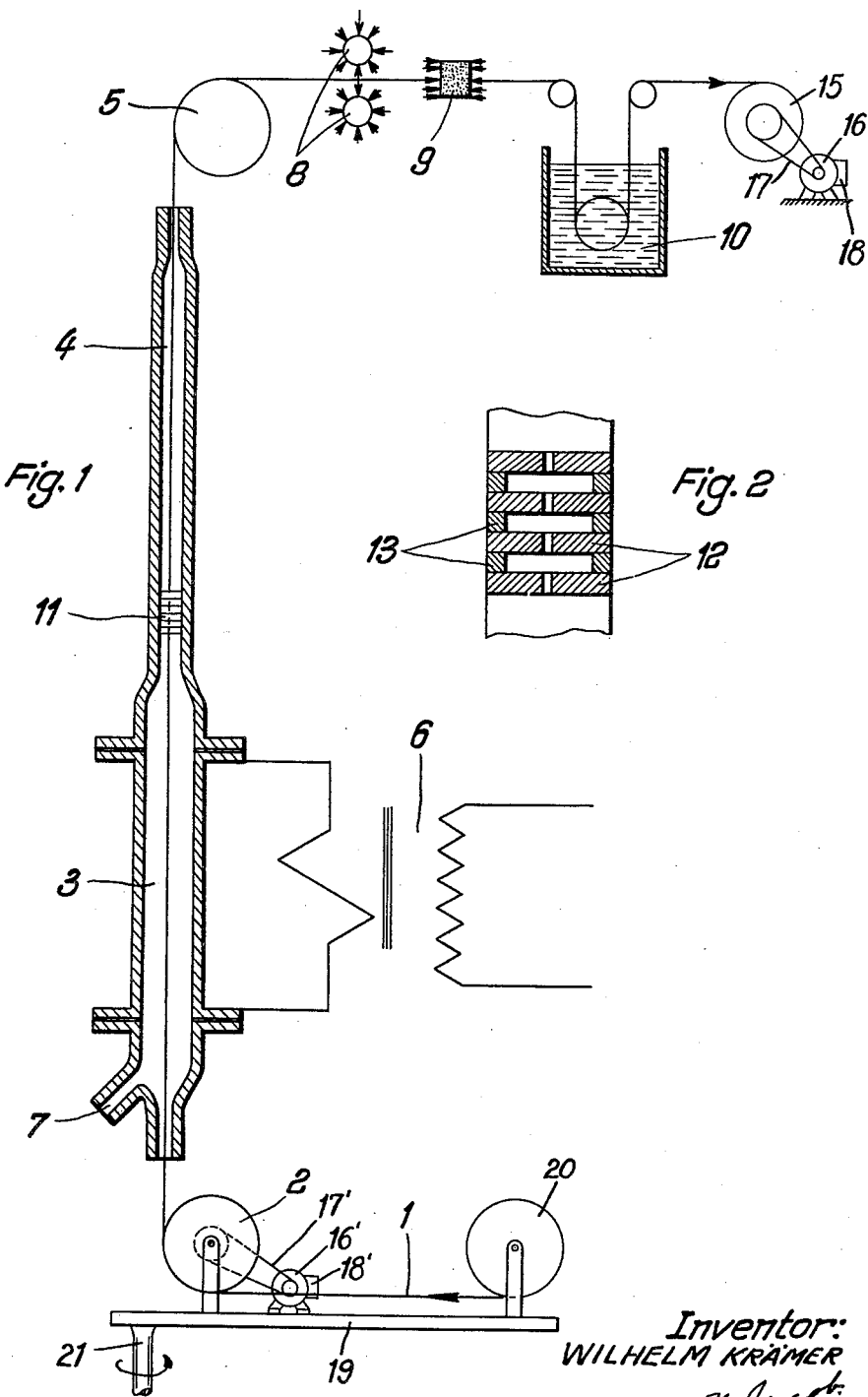

3,053,686
METHOD OF PREPARING WIRE FOR
WIRED GLASS
Wilhelm Krämer, Im Hohn 31, Bad Godesberg, Germany
Filed Nov. 24, 1958, Ser. No. 776,092
9 Claims. (Cl. 117—7)

The present invention relates to glass coated or armored wire and is particularly concerned with a method of making such wire.

It is an object of the invention to provide a method of making armored wire while avoiding the formation of bubbles or blisters in the glass coating even if ordinary iron wire is used.

In accordance with the invention a method is provided for preparing cold drawn wire for armoring in glass and which comprises cleaning the wire of grease and gas prior to armoring in the heated glass by heating the wire, cleaning the wire of combustion residue after cooling and then providing the wire surface with a gas proof coating which during the later heating procedure escapes without leaving a residue.

Wire inserts for manufacturing wired glass or armored wire are made of iron wire, the surface of which must be clean of grease, dust and rust because these impurities of the wire cause blisters and cloudiness in the glass portion of the wire. The wire is made into nets, woven and lattice objects and is then embedded in the heated liquid glass mass or is fed through in one direction without being formed or tied to any shape. The wires are cold drawn from rolled wire in a liquid through nozzles in conventional manner with intermediate annealing steps and are finally annealed in tempering boxes while excluding oxygen or in a reducing gas atmosphere. For this purpose the wire is stacked in the form of rings weighing 30 to 50 kg. lying on top of one another in the tempering box in quantities of approximately two tons. Under these conditions the wire should not be heated in the tempering box to an extent that softening of the iron wire causes adhesion of individual wire turns to one another which later would make unwinding impossible. The tempering box is also closed so that escape of impurities in the wire is not possible.

For the purpose of meeting the requirement of freedom from grease and dust substances, especially selected drawing fluids are used, all of which, however, must still contain more or less grease or also a special lubricant as the cold forming or drawing in the drawing channel is otherwise not possible. As a result the cold drawn wire, even that used for wired glass, has a more or less heavy layer of grease and cannot be considered to be sufficiently free of grease.

The fatty particles resulting from the drawing process which also outlast the annealing step are released only from the iron when the wire is immersed in the liquid glass mass by being burned and gasified. However, since the gases which are freed cannot escape from the tough glass mass, they become embedded as bubbles in the glass and constitute a considerable impurity and adverse effect on the clearness of the glass.

For that reason it has become the practice to chromium plate the wire before introduction into the glass mass, which somewhat decreases but does not eliminate the bubble formation. Furthermore, a considerable cost increase of the embedded wire has resulted without the measure being completely satisfactory. Only the use of chrome-nickel steel has resulted in blister-free wired glass. That is due to the fact that the production of these wires is carried on under entirely different conditions than that of the non-alloyed wires. Due to the great strength of these wires there exists much greater pressure in the drawing channel. Accordingly the drawing grease cannot combine with the material during cold drawing so that the highly annealed wire comes out of the drawing machine much freer of grease than non-annealed wire. To this is added that also the annealing is carried out differently and at a higher temperature and that due to the greater density of the material, the wire does not absorb so much glass. Such wire is extremely expensive so that it cannot be used for armored wire and since, in addition, it cannot be used for making nets due to its poor welding qualities, it is used only in the manufacture of high quality special glasses and where welding of the wires is not necessary.

It has been established by tests that even with complete degreasing of the surface of ordinary wired glass the bubble formation does not cease. This appears to be due to the fact that in the drawing process fatty impurities are pressed even between the iron molecules. In the customary cold forming of the wire these impurities are greater as the wire is drawn thinner because during each drawing new fatty particles are pressed between the iron molecules. These particles are only solved under the physical conditions attending the immersion of the wire into the liquid glass mass and during gasification they form the bubbles or blisters. It must be assumed that this causes primarily the larger bubbles.

Aside from the larger bubbles, many minute bubbles are also formed which likewise originate from the wire. The gases which are absorbed by the wire are also forced out of the wire by the heat of the molten glass and form the minute bubbles in the wire glass.

While it is known to treat the surface of planar metal objects and of castings to remove adhering greasy films by annealing, the invention is based on the discovery that the cold drawn wire used heretofore for wired glass inserts is not sufficiently cleaned in spite of the preliminary treatment to which it is subjected and that the use of the annealing treatment in accordance with the invention results not only in cleaning of the outer surface of the wire but also in cleaning and degassing of the wire body of the thin wires used for glass inserts in a very complete fashion. It has been found that the development of bubble formation is most extensively eliminated in the manufacture of the wired glass.

It has already been proposed in the manufacture of wired glass to provide the wires with a covering of fire resistant resilient material, primarily asbestos. In this manufacturing method the impurities remain in the wire or upon the wire surface, and covering the wire surface with a resilient material such as asbestos contributes to the inclusion of additional air, which only results in increasing the bubble formation in the wired glass.

It is desirable to effect the degreasing and above all the extensive degasification of the wire approximately at that temperature to which the wire is later exposed when it is introduced in the liquid glass mass, if the high heating of the wire is undertaken in this manner and optimum results are obtained in the production of a bubble free wired glass. This method of operation has to be carried out either in one extensive sufficiently long step or in repeated steps, because the complete degasification of the wire requires a certain length of time depending on the thickness of the wire. It is suitable to carry this out in a vacuum because then the temperature may be somewhat lower or the process may be shortened. Also a drawing and/or rotational effect on the wire is advantageous during the heat application in order to permit the enclosed impurities to be freed more quickly. Exposure of the wire to these effects results in further decrease of its diameter so that in this manner economies in the production are achieved. The gases developed during the process are suitably drawn off, preferably by maintaining a constant vacuum. Since the absorption of the gas by the wire becomes constantly smaller as the temperature increases, it is possible to use a neutral or even a reducing gas instead of the vacuum, which prevents the oxidation and carries off the gases which escape out of the wire in a light stream.

For this treatment of the wire it is possible to use a pull-through annealing oven which is particularly adapted for the purpose. In this manner it is possible during the degassing and degreasing of the wire to obtain simultaneously a grease free further forming or drawing of the wire. After the wire has been degreased it is cleaned of the combustion residue which has been left behind upon its surface by the separated grease. For this purpose the wire may either be conducted through a detergent solution or it may be cleaned and polished mechanically, for example with brushes, leather or felt disks. In this manner a degree of purity is obtained which can be chosen as desired and which depends upon the length and the frequency of the application of the cleaning process. The completely degreased wire naturally corrodes more readily than the commercially available wire to which the drawing grease still adheres. Besides, all pores are widely opened so that the absorption of air is resumed immediately.

In order to form the coating upon the wire surface it is preferable to use a readily ignited oil, for example paraffin oil. This coating constitutes a breath thin layer, which burns and disintegrates as it approaches the hot glass mass without leaving any residue before the wire is enclosed in the glass mass.

The drawing forces can be readily controlled in a pull-through oven by taking advantage of the attendant advancing of the wire. It will be found simplest if the wire coming out of the heat zone is imparted somewhat greater velocity than the wire which is approaching the heat zone, whereby the glowing wire is subjected to a drawing tension which changes its shape. It is also possible, however, to employ instead of the drawing factor or in combination therewith a moment of rotation.

In the heat, which is approximately 1100° C., depending upon the glass manufacturing process, the relatively thin wire no longer has great strength, so that in horizontally constructed pull-through annealing ovens it would develop considerable sagging and would rub against the walls of the heating tube or of the oven, and under certain circumstances it might tear. Consequently an oven is preferred in accordance with the invention in which the wire runs vertically through the heating zone without changes in direction. In this manner uninterrupted operation of the installation is possible to a very considerable degree. Also the exact control of the forces required for the drawing of the wire is assisted by the use of a vertical oven. The construction of the pull-through oven may also be chosen in accordance with the invention in such a manner that not only a single wire but a complete wire net, a wire weaving or mesh can be guided through the pull-through oven in fully extended condition. The capacity of the installation is thus considerably enhanced. Besides, the impurities which the wire picks up during the forming of the nets or meshes are likewise eliminated.

The discoloring which necessarily develops at the crossover points of welded wire nets during the welding step is likewise eliminated by this method if a reducing gas is used in the pull-through oven.

Further objects and details of the invention will become apparent from the following specification with reference to the accompanying drawings in which:

FIG. 1 illustrates schematically as an embodiment of the invention an installation for carrying out the method, and FIG. 2 illustrates a gasket on an enlarged scale.

The conventional iron wire 1, which is cold drawn in a known manner, is guided by way of roller 2 to the vertically disposed electrically heated annealing tube 3, in the interior of which the high temperature is developed which corresponds to that which the wire has during wired glass production. Since there are different wired glass production methods which employ different temperatures, the temperature of the method is taken into consideration when the oven is constructed. The length of the through passing time depends on the thickness of the material. It has to be computed in a manner that the wire is sufficiently degasified and degreased after it has passed through the heating tube 3. It then arrives in the cooling tube 4 in which it is again cooled to the ambient temperature, while care must be taken that the desired values as to strength are attained.

At the transfer from the heating tube to the cooling tube a gasket 11 is provided which is intended to keep away the heat as much as possible from the cooling tube. FIG. 2 shows that this gasket is in the form of a labyrinth gasket having a number of stacked disks 12 and 13. The disks 12 are provided with a bore which is adapted to the diameter of the wire, while the central aperture of the disk 13 is substantially larger.

The roller 5 imparts to the wire 1 emerging from the cooling tube 4 a velocity which is somewhat greater than the circumferential velocity by means of which the roller 2 is driven. The difference in velocity between the wire entering the heating tube 3 and the end emerging from the cooling tube may be small if it is intended to remove only fatty impurities in the wire. However, if the arrangement is simultaneously used for warm drawing the wire, conditions are different. In that event the roller 5 must impart to the wire 1 a much greater velocity with respect to roller 2 as corresponds to the expansion of the wire for the relative decrease in cross-sectional area.

The electric heating tube 3 is supplied with current by way of transformer 6. It is, of course, also possible to use a different form of heating, for example gas. The tubular stub 7 serves for producing the vacuum and for drawing off the gases which form during operation of the oven or also for feeding in the reducing gases. If the wire is to be treated in a vacuum, the conveying pulleys 2 and 5 as well as the associated winding and unwinding devices may likewise be accommodated in a vacuum. In the arrangement in accordance with the drawing the oven must be operated with a protective gas.

After the wire has passed pulley 5, it is cleaned and polished between the pairs of brush rollers 8 and 9. For this purpose it may also be drawn through a cleaning fluid. Now the wire has a clean, smooth outer surface and is internally free of grease and gas deposits. In the bath 10 the oil film is applied and is stripped down to a thin layer. The oil film may also be applied by pulling the wire through an oil soaked ball of gauze. The oil used for that purpose is of a type which will completely burn at low temperature without leaving any residue. This closes the pores in the cool wire so that gas absorption cannot take place again. Besides, the wire is protected in this manner against oxidation. To obtain highest quality the pairs of rollers 8 and 9, as well as also the bath 10, may be provided in the space of the oven vacuum so that the subsequent gas absorption is avoided under all circumstances. The use of paraffin oil has proven to be very effective.

For the purpose of imparting to the wire emerging from the heating zone a greater velocity than that of the portion approaching the heating zone the wire runs both at the upper end and at the lower end of the apparatus over rollers which rotate at different speeds. The pulling roller 15 at the upper end is driven by a motor 16 of any type via a drive means, for example, a belt or chain drive 17. The velocity of motor 16 may be controlled by any type of regulating device 18 provided on the motor. The feed roller 2 is driven by its own motor 16' by way of a belt or chain drive 17. Motor 16' may be adjusted to a lower velocity than that of motor 16 by means of the control 18' associated therewith.

In order to impart to the wire the rotational effect referred to hereinabove, the lower roller 2 together with its driving means 16', 17' and the supply drum 12 from which the wire 1 is pulled are mounted on a platform 19 which is arranged for rotation about an axis 21 extending substantially in alignment with the vertical axis of the upwardly moving wire.

It is possible in this manner to avoid the formation of bubbles in the wired glass production, even if the conventional iron wire is used. The carbon content of the iron is by no means an obstacle. The suction qualities of the wire do not become effective until the gas-proof coating has been melted away, i.e. until immediately prior to the immersion of the wire in the liquid glass mass. As a consequence, the carbon content of the wire cannot unfavorably affect the process as far as the absorption qualities of the wire are concerned.

Having now fully described my invention with reference to the embodiment illustrated, I do not wish to be limited thereto, but what I desire to protect by Letters Patent of the United States is set forth in the appended claims.

I claim:

1. In the manufacture of wired glass the method of preparing cold drawn wire to be embedded in glass, said method comprising the steps of subjecting the wire to a cleaning heat treatment at a temperature up to that to which the wire is heated by immersion in the molten glass mass to be embedded therein, cooling the wire thus treated and cleaning off any remaining combustion residue, and immediately following said step, treating the wire surface with a substance adapted to prevent re-entering of gases and impurities into the wire surface and leaving no visible residue on the wire when contacted with the molten glass mass.

2. Method according to claim 1, wherein at least the heat treatment is performed in a vacuum.

3. Method according to claim 1, wherein the heat treatment, cooling, cleaning, and final surface treatment are performed in a non-oxidizing medium.

4. Method according to claim 1, wherein the wire, during heat application to the same, is exposed to a stress for facilitating escape of gases and other impurities enclosed in the wire.

5. In the manufacture of wired glass the method of preparing cold drawn wire to be embedded in glass, said method comprising the steps of subjecting the wire to a cleaning heat treatment to remove adhering and embedded grease and gas impurities prior to immersion in the molten glass mass, cooling the wire thus treated and cleaning off any remaining combustion residue, and immediately following said step, sealing the wire surface with a coating of organic substance capable of burning without residue when contacted with the molten glass mass, said cleaning heat treatment being effected at a temperature corresponding to the temperature at which the wire is embedded in the liquid glass mass.

6. In the manufacture of wired glass the method of preparing cold drawn wire to be embedded in glass, said method comprising the steps of subjecting the wire to a cleaning heat treatment to remove adhering and embedded grease and gas impurities prior to immersion in the molten glass mass, cooling the wire thus treated and cleaning off any remaining combustion residue, and immediately following said step, sealing the wire surface with a coating of organic substance capable of burning without residue when contacted with the molten glass mass, said cleaning heat treatment being effected at a temperature corresponding to the temperature at which the wire is embedded in the liquid glass mass and subjecting the wire during the cleaning heat treatment to a pulling force.

7. In the manufacture of wired glass the method of preparing cold drawn wire to be embedded in glass, said method comprising the steps of subjecting the wire to a cleaning heat treatment to remove adhering and embedded grease and gas impurities prior to immersion in the molten glass mass, cooling the wire thus treated and cleaning off any remaining combustion residue, and immediately following said step, sealing the wire surface with a coating of organic substance capable of burning without residue when contacted with the molten glass mass, said cleaning heat treatment being effected at a temperature corresponding to the temperature at which the wire is embedded in the liquid glass mass and subjecting the wire during the cleaning heat treatment to a rotary force.

8. In the manufacture of wired glass the method of preparing cold drawn wire to be embedded in glass, said method comprising the steps of subjecting the wire to a cleaning heat treatment to remove adhering and embedded grease and gas impurities prior to immersion in the molten glass mass, cooling the wire thus treated and cleaning off any remaining combustion residue, and immediately following said step, sealing the wire surface with a coating or organic substance capable of burning without residue when contacted with the molten glass mass, said cleaning heat treatment being effected at a temperature corresponding to the temperature at which the wire is embedded in the liquid glass mass and subjecting the wire during the cleaning heat treatment to a pulling force, said cleaning heat treatment being effected in a vacuum.

9. In the manufacture of wired glass the method of preparing cold drawn wire to be embedded in glass, said method comprising the steps of subjecting the wire to a cleaning heat treatment to remove adhering and embedded grease and gas impurities prior to immersion in the molten glass mass, cooling the wire thus treated and cleaning off any remaining combustion residue, and immediately following said step, sealing the wire surface with a coating of organic substance capable of burning without residue when contacted with the molten glass mass, said cleaning heat treatment being effected at a temperature corresponding to the temperature at which the wire is embedded in the liquid glass mass and subjecting the wire during the cleaning heat treatment to a pulling force, said cleaning heat treatment being effected in a vacuum and said coating applied after cleaning being paraffin oil or the like.

References Cited in the file of this patent

UNITED STATES PATENTS

| | | |
|---|---|---|
| 1,688,481 | Austin et al. | Oct. 23, 1928 |
| 1,837,455 | Lewis | Dec. 22, 1931 |
| 1,930,601 | Townsend | Oct. 17, 1933 |
| 2,151,353 | Montgomery | Mar. 21, 1939 |
| 2,288,980 | Turim | July 7, 1942 |
| 2,359,993 | Keene | Oct. 10, 1944 |
| 2,417,028 | Wells | Mar. 4, 1947 |
| 2,625,495 | Cone | Jan. 13, 1953 |
| 2,633,428 | Klug | Mar. 31, 1953 |